Patented Apr. 30, 1940

2,199,021

UNITED STATES PATENT OFFICE 2,199,021

MINERAL OIL COMPOSITION AND PROCESS OF PRODUCING SAME

Thomas W. Bartram, Nitro, W. Va., assignor to Monsanto Chemical Company, St. Louis, Mo., a corporation of Delaware No Drawing. Application February 12, 1936, Serial No. 63,580

29 Claims. (Cl. 44—9)

This invention relates to improvements in means for the protection of liquid hydrocarbons against the formation of insoluble and gummy products. More particularly the present invention relates to improved materials for use with liquid hydrocarbons which may be used as fuels.

Liquid hydrocarbons for example gasoline as commercially produced when prepared by the cracking of petroleum, possess a tendency on standing to form gums and resinous substances. Gasolines produced by the modern cracking processes are extremely complicated mixtures comprising many constituents, the character of these constituents and the relative proportions of the different constituents depending upon the source of the crude and the particular cracking process employed. Among other constituents the crude cracked gasoline contains unsaturated hydrocarbons, such as for example the olefines and diolefines. The more recent pressure methods of vapor phase cracking result in a considerably higher percentage of diolefines than the older methods. It has thus become necessary to treat the crude products resulting from the more recent cracking processes in some manner to remove the greater part of these more highly unsaturated products. Among these methods of treatment may be mentioned the sulfuric acid treatment and the fuller's earth vapor phase treatment. While these methods have been largely practiced, their use is open to many disadvantages among which is the necessary expense involved.

This development of gums and resins in mineral oil products and more specifically in gasoline causes such undesirable effects when employed in internal combustion engines as sticking of the valve stems and excessive carbon formation.

In accordance with this invention the development of these undesirable characteristics in petroleum products may be readily prevented or materially delayed without substantially increasing the cost of production thereof.

The present invention has for an object the inhibition of the formation of gums and resins in oil compositions.

Another object of the present invention is to provide a new mineral oil product possessing improved properties particularly for use as a fuel for internal combustion engines. The treating means and special compositions disclosed herein are likewise adaptable for use as a transformer oil, as a lubricating means, as a heat circulating medium and analogous uses wherein it is desirable that an improved and satisfactory stable mineral oil product be employed.

Another object is to provide a method and means of the character referred to that will not appreciably increase the cost of production of petroleum products.

Other objects of the invention will be apparent from the following description.

The class of materials which have been found to possess the desirable qualities set forth in that small proportions thereof when incorporated in a relatively unstable oil product, for example gasoline, improve the quality and materially increase the stability thereof, comprise reaction products of ketones and phenols, and more specifically the reaction products of aliphatic ketones and phenols.

In order to test the gum inhibiting properties of the preferred class of materials, the following procedure, which is essentially that described by Egloff, Morrell, Lowry and Dryer in Industrial and Engineering Chemistry, vol. 24, pages 1375 to 1382 (1932), was employed.

Into a suitably sized bomb of the type described in the above literature reference, there was placed an 8 ounce oil sample bottle containing 200 c. c. of an unstable gasoline, as for example vapor phase cracked gasoline, to which had been added a small proportion of one of the preferred class of materials, which may be called "gum inhibitors." The lid was placed tightly on the bomb. Substantially one hundred pounds pressure of oxygen was introduced into the bomb by means of a suitable valve. The bomb was then connected by means of a delivery tube with a recording presure gauge, after which it was heated in a steam bath until a sharp drop in the pressure curve indicated an end of the stability of the unstable fuel, and a rapid reaction of the oxygen with certain unsaturated compounds in the gasoline. This period of stability is frequently called the induction period.

Example I

As one specific example of the use of the preferred class of stabilizers of unstable mineral oil products, as for example cracked gasoline, substantially one molecular proportion of cyclohexanone and an excess over substantially two molecular proportions of catechol were heated at a convenient temperature, for example 45–50° C. in a suitable solvent, for example glacial acetic acid and in the presence of a suitable catalyst, for example hydrochloric acid. After removal of any unreacted materials, the residual product comprised a solid. It is believed the resulting product was produced by the interaction of substantially one mol of cyclohexanone and substantially two mols of catechol. 50 milligrams of the product so obtained were incorporated in 200 c. c. of the unstable vapor phase cracked gasoline and the treated gasoline tested for stability in the maner described above. The period of stability or the induction period of the treated gasoline was 210 minutes as compared to an induction period of 90 minutes for the untreated gasoline.

*Example II*

As a further specific embodiment of the present invention, substantially one molecular proportion of catechol and substantialy two molecular proportions of acetone were refluxed on a steam bath in the presence of a suitable catalyst or condensing agent, for example a small quantity of bromine. While a large excess of acetone was employed, it is believed the product produced resulted essentially from the reaction of substantially one mol of acetone and substantially two mols of catechol. After removal of any unreacted materials, 50 milligrams of the residual product comprising a viscous resin were incorporated in 200 c. c. of an unstable vapor phase cracked gasoline and the treated gasoline tested for stability in the manner described above. The period of stability or the induction period of the treated gasoline was 205 minutes as compared to an induction period of 90 minutes for the untreated gasoline.

Other specific examples of the preferred class of materials that have been incorporated in an unstable gasoline according to the present invention and found to increase the stability thereof are p,p' dihydroxy diphenyl dimethyl methane (produced by reacting acetone and phenol), p,p' dihydroxy diphenyl cyclohexane (produced by reacting cyclohexanone and phenol), reaction product of acetone and beta naphthol, dimethyl diortho methoxy di para hydroxy diphenyl methane (produced by reacting substantially one molecular proportion of p,p' dihydroxy diphenyl dimethyl methane and substantially two molecular proportions of formaldehyde) and the reaction product of 1:5 dihydroxy naphthalene and cyclohexanone.

The above examples set forth are to be understood as specific embodiments of this invention and in no sense limitative of the scope thereof.

In place of the ketones hereinbefore disclosed I may employ methyl ethyl ketone, 1-methyl cyclohexanone, di-isopropyl ketone, methyl isobutyl ketone and analogues and equivalents thereof. In place of the phenols hereinbefore disclosed, I may employ the cresols, the xylenols, the phenyl phenols, resorcinols and the like.

From the data hereinbefore set forth, it is readily shown that the preferred class of compounds constitute an important class of stabilizers of mineral oil products.

If convenient or desirable, if the inhibitor to be added to the unstable oil product, for example gasoline, is not readily soluble therein, it may be dissolved in a suitable solvent and the solution of the inhibitor thus prepared added thereto. In any case, however, it is preferred to use an amount of the inhibitor somewhat less than the amount of gum that would otherwise be formed by the fuel being treated.

Other similar oil compositions designed for particular uses may be prepared in the manner described by substituting the desired oil fraction or cut and adding the necessary quantity of stabilizer thereto.

What is claimed is:

1. A composition of matter comprising a mineral oil hydrocarbon of the type tending to form gum during storage containing as a gum inhibiting agent a small amount of a reaction product formed by condensing substantially two molecular proportions of an aromatic compound having an hydroxy radical substituted on the nucleus thereof with substantially one molecular proportion of a ketone.

2. A composition of matter comprising a mineral oil hydrocarbon of the type tending to form gum during storage containing as a gum inhibiting agent a small amount of a reaction product formed by condensing substantially two molecular proportions of an aromatic compound having a plurality of substituents on the nucleus thereof, at least one of which is an hydroxy radical, with substantially one molecular proportion of a ketone.

3. A composition of matter comprising a mineral oil hydrocarbon of the type tending to form gum during storage containing as a gum inhibiting agent a small amount of a reaction product formed by condensing substantially two molecular proportions of an aromatic compound having an hydroxy radical substituted on the nucleus thereof with substantially one molecular proportion of an aliphatic ketone.

4. A composition of matter according to claim 2 in which one of the nuclear substituents is an aromatic hydrocarbon radical.

5. A composition of matter according to claim 2 in which one of the nuclear substituents is an aliphatic hydrocarbon radical.

6. A composition of matter comprising a mineral oil hydrocarbon of the type tending to form gum during storage containing as a gum inhibiting agent a small amount of a reaction product formed by condensing substantially two molecular proportions of an aromatic compound having a plurality of hydroxy radicals substituted on the nucleus thereof with substantially one molecular proportion of a ketone.

7. A composition of matter comprising a mineral oil hydrocarbon of the type tending to form gum during storage containing as a gum inhibiting agent a small amount of a reaction product formed by condensing substantially two molecular proportions of an aromatic compound having a plurality of hydroxy radicals substituted on the nucleus thereof with substantially one molecular proportion of an aliphatic ketone.

8. A composition of matter comprising a cracked hydrocarbon having incorporated therein a small proportion of a reaction product formed by condensing substantially two molecular proportions of a phenol and substantially one molecular proportion of a ketone.

9. A composition of matter comprising a cracked hydrocarbon having incorporated therein a small proportion of a reaction product formed by condensing substantially two molecular proportions of a phenol and substantially one molecular proportion of an aliphatic ketone.

10. A composition of matter comprising a cracked hydrocarbon having incorporated therein a small proportion of a reaction product formed by condensing cyclohexanone and catechol.

11. A composition of matter comprising a cracked hydrocarbon having incorporated therein a small proportion of a reaction product formed by condensing catechol and acetone.

12. A composition of matter comprising a cracked hydrocarbon having incorporated therein a small proportion of a reaction product formed by condensing substantially one molecular proportion of cyclohexanone and substantially two molecular proportions of catechol.

13. A composition of matter comprising a cracked hydrocarbon having incorporated therein a small proportion of a reaction product formed by condensing substantially one molecular proportion of acetone and substantially two molecular proportions of catechol.

14. Gasoline produced by the cracking of mineral oils to which has been added a small proportion of a reaction product formed by condensing substantially two molecular proportions of a phenol and substantially one molecular proportion of a ketone.

15. Gasoline produced by the cracking of mineral oils to which has been added a small proportion of a reaction product formed by condensing substantially two molecular proportions of a phenol and substantially one melocular proportion of an aliphatic ketone.

16. Gasoline produced by the cracking of mineral oils to which has been added a small proportion of a reaction product formed by condensing cyclohexanone and catechol.

17. Gasoline produced by the cracking of mineral oils to which has been added a small proportion of a reaction product formed by condensing catechol and acetone.

18. Gasoline produced by the cracking of mineral oils to which has been added a small proportion of a reaction product formed by condensing substantially one molecular proportion of cyclohexanone and substantially two molecular proportions of catechol.

19. Gasoline produced by the cracking of mineral oils to which has been added a small proportion of a reaction product formed by condensing substantially one molecular proportion of acetone and substantially two molecular proportions of catechol.

20. A liquid hydrocarbon mixture of the type tending to form gum during storage, containing as a gum inhibiting agent an amount of a reaction product formed by condensing a monocyclic phenol and an aliphatic ketone substantially less than that of the potential gum of the said liquid hydrocarbon mixture.

21. A petroleum distillate motor fuel of the type tending to form gum during storage, containing an amount of a reaction product formed by condensing a monocyclic phenol and an aliphatic ketone substantially less than that of the potential gum of the said motor fuel.

22. Gasoline produced by the cracking of petroleum oils, containing an amount of a reaction product formed by condensing an ortho-substituted monocyclic phenol and an aliphatic ketone substantially less than that of the potential gum of the said gasoline.

23. Gasoline produced by the cracking of petroleum oils, containing a small amount of a bis-[hydroxy-phenyl]-dialkyl-methane.

24. Gasoline produced by the cracking of petroleum oils, containing an amount of a phenol-aliphatic ketone resin substantially less than that of the potential gum of said gasoline.

25. A process for prolonging the induction period for gum formation in a liquid hydrocarbon mixture of the type tending to form gum during storage, which comprises maintaining said mixture in contact with an amount of a reaction product formed by condensing a monocyclic phenol and an aliphatic ketone substantially less than that of the potential gum of the said hydrocarbon mixture.

26. A process for prolonging the induction period for gum formation in a petroleum distillate motor fuel of the type tending to form gum during storage, which comprises maintaining said motor fuel in contact with an amount of a reaction product formed by condensing a monocyclic phenol and an aliphatic ketone substantially less than that of the potential gum of the said motor fuel.

27. A process for prolonging the induction period for gum formation in gasoline produced by the cracking of petroleum oils which comprises maintaining said gasoline in contact with an amount of a reaction product formed by condensing an ortho-substituted monocyclic phenol and an aliphatic ketone substantially less than that of the potential gum of the said gasoline.

28. A process for prolonging the induction period for gum formation in gasoline produced by the cracking of petroleum oils which comprises maintaining said gasoline in contact with a small amount of a bis-[hydroxy-phenyl]-dialkyl-methane.

29. A process for prolonging the induction period for gum formation in gasoline produced by the cracking of petroleum oils which comprises maintaining said gasoline in contact with an amount of a phenol-aliphatic ketone resin substantially less than that of the potential gum of said gasoline.

THOMAS W. BARTRAM.